United States Patent [19]

Cantello

[11] Patent Number: 4,482,851
[45] Date of Patent: Nov. 13, 1984

[54] CONTROL CIRCUIT FOR STEPPING MOTOR
[75] Inventor: Giuseppe Cantello, S. Giusto Can., Italy
[73] Assignee: Ing. C. Olivetti & C., S.p.A., Ivrea, Italy
[21] Appl. No.: 454,287
[22] Filed: Dec. 29, 1982
[30] Foreign Application Priority Data
Dec. 30, 1981 [IT] Italy .................. 68708 A/81
[51] Int. Cl.³ ............................................ H02K 29/04
[52] U.S. Cl. .................................... 318/696; 318/685
[58] Field of Search ................ 318/696, 685; 361/152, 361/154
[56] References Cited
U.S. PATENT DOCUMENTS
3,699,413 10/1972 de Sae Silva et al. .......... 318/696 X 4,319,301 3/1982 Hill ...................................... 361/152

Primary Examiner—J. V. Truhe
Assistant Examiner—Saul M. Bergmann
Attorney, Agent, or Firm—Banner, Birch, McKie & Beckett

[57] ABSTRACT

A control circuit for a stepping motor comprises a voltage multiplier which, in synchronism with the motor timing pulses from a pulse generator multiplies the supply-voltage in such a manner as to obtain an energizing voltage which, at commencement of the excitation of each motor winding, has a value which is a multiple of the value of the supply voltage, in order to reduce the rise time of the current in the windings, and to thus improve the dynamic torque availability. A voltage doubler and tripler are described as examples of the circuit.

9 Claims, 6 Drawing Figures

CONTROL CIRCUIT FOR STEPPING MOTOR

This invention relates to a control circuit for a stepping motor comprising a plurality of windings which can be energised selectively and sequentially. The circuit comprises a power supply unit arranged to generate a voltage of predetermined value for supplying the motor, a timing pulse generator, and a translator connected to the pulse generator and arranged to generate a series of sequential logic signals for controlling the excitation windings of the motor.

A control circuit is known in which, in order to reduce the current rise time in the motor windings, the voltage supplied to the windings at the commencement of their excitation is raised to a value much higher than its rated value. In order to attain this, a power supply unit is used able also to generate a second voltage higher than the predetermined value. The two voltages are supplied alternately to the motor using either switching circuits, which however generate high frequency disturbances which are difficult to eliminate, or series resistors which lead to high energy dissipation. In addition, a circuit of this type has the drawback of using a power supply unit which is overdimensioned for the motor characteristics, and is thus more costly.

The object of the present invention is to provide a control circuit for a stepping motor which is able to supply a quickening voltage by using the actual voltage of predetermined value supplied by the power supply unit, and which at the same time is reliable, simple and economical.

In accordance with this object, the circuit according to the invention is characterised by a voltage multiplier connected between the power supply unit and motor, and synchronised with the timing pulses so as to multiply the supply voltage at the commencement of excitation of each motor winding.

The invention will now be described in more detail, by way of example, with reference to the accompanying drawings, in which.

Figure 1:
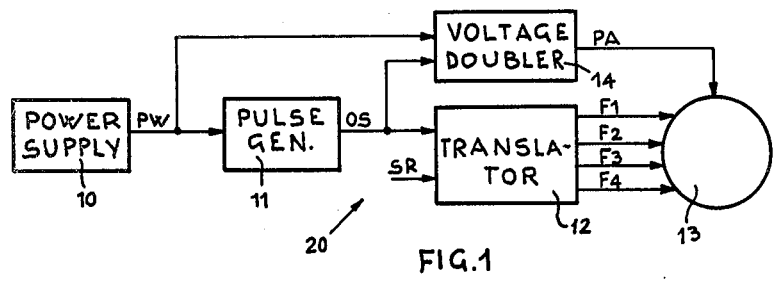
FIG. 1 is a block diagram of a control circuit embodying the invention.

With reference to FIG. 1, a circuit 20 embodying the invention for controlling a stepping motor 13 comprises a power supply unit 10 arranged to generate a d.c. voltage PW of predetermined constant value, for example 12 Volts, a generator 11 for timing pulses OS having a period T1 (FIG. 4), for example 2 msec., and a translator 12 (FIG. 1) constituted by a known logic circuit which converts the pulses OS into a series of sequential signals F1, F2, F3 and F4 arranged to control the excitation windings of the motor 13, as will be more apparent hereinafter. By way of example, the translator 12 can comprise a reversible loop binary counter having a modulus equal to the number of windings of the motor 13.

To one input of the translator 12 there is also applied logic signal SR, which is arranged to reverse the output sequence of the signals F1, F2, F3, F4 when it is required to change the direction of rotation of the motor 13.

In practising the invention, a portion 14 of the circuit 20 is arranged to double the value of the voltage PW in synchronism with the pulses OS, and to provide at its output a power signal PA for the effective excitation of the windings of the motor 13.

Figure 2:
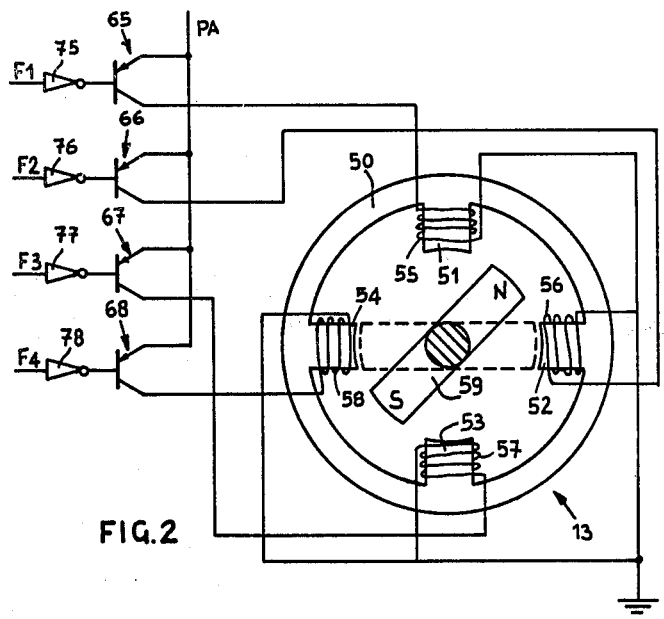
FIG. 2 is a diagrammatic representation of a stepping motor suitable for control by the circuit according to FIG. 1.

As shown diagrammatically in FIG. 2, a stepping motor 13 for control by the circuit 20 comprises a stator 50 provided with radial pole pieces 51, 52, 53 and 54, on which there are wound windings 55, 56, 57 and 58 respectively. A rotor 59, constituted by a permanent magnet, is rotatably mounted on a shaft 60. The windings 55, 56, 57 and 58 each have one end connected to the collector of a corresponding transistor 65, 66, 67 and 68 respectively, and a common end connected to earth. The transistors 65, 66, 67 and 68 have their emitters all connected to the output PA of the voltage doubler 14 and their bases connected individually to the outputs F1, F2, F3 and F4 respectively of the translator 12 by way of inverters 75, 76, 77 and 78 respectively. The connections between the windings of the motor 13 and the outputs of the translator 12 shown herein and purely indicative and shown only as an example of application of the circuit according to the invention. It is apparent that other types of stepping motor and other types of connection between the windings and the translator can be used.

Figure 3:
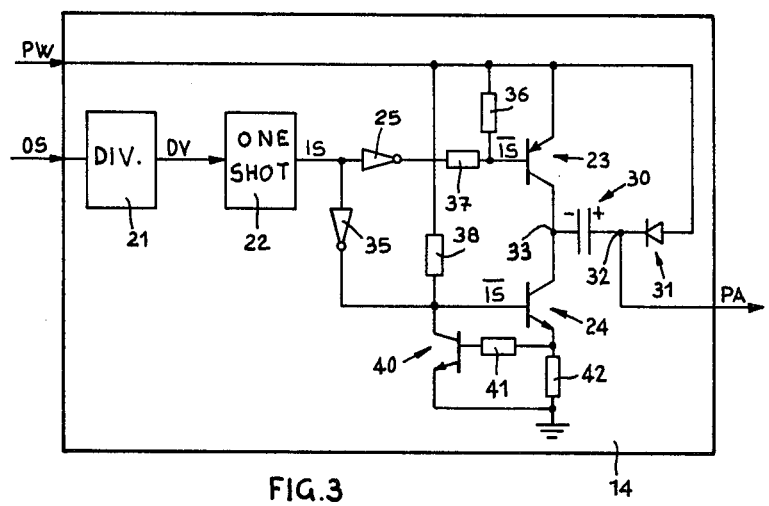
FIG. 3 is a diagram of a detail of the circuit of FIG. 1.

The voltage doubler 14 (FIG. 3) comprises a divider 21, which converts the OS pulses into a square wave logic signal DV (FIG. 4) having one rising front for every two OS pulses. A one-shot time 22 (FIG. 3) converts the signal DV into a logic signal IS, which is normally at level 0 and goes to level 1 at each falling front of the signal DV (FIG. 4), then to remain at the level 1 for a time T2, for example 1.25 msec. The operation of the one-shot 22 is explained hereinafter.

The doubler 14 (FIG. 3) also comprises two switches 23, 24 for example in the form of transistors of PNP and NPN type respectively, connected in series. The transistor 23 has its base controlled by a logic signal $\overline{IS}$, (this being the signal IS inverted by an inverter 25), its emitter connected to the output PW of the power supply unit 10, and its collector connected to the collector of the transistor 24. This latter has its base controlled by the logic signal IS inverted by a second inverter 35, and its emitter connected to earth. For correct control of the transistors 23 and 24, a resistor 36 is connected between the output PW and the base of the transistor 23, a resistor 37 is connected in series between the inverter 25 and the base of the transistor 23, and a resistor 38 is connected between the output PW and the base of the transistor 24.

A capacitor 30 has a first plate connected to the collectors of the transistors 23 and 24 at a point 33 of the circuit, and a second plate connected to the cathode of a diode 31, which has its anode connected to the output PW of the power supply unit 10. The signal PA is taken at a point 32 of the circuit between the capacitor 30 and the diode 31.

A current limiter, constituted by an NPN transistor 40 and two resistors 41 and 42, is connected between the emitter of the transistor 24 and its base in order to limit the peak value of the charging current of the capacitor 30 to predetermined value, for example 0.7 A.

Figure 4:
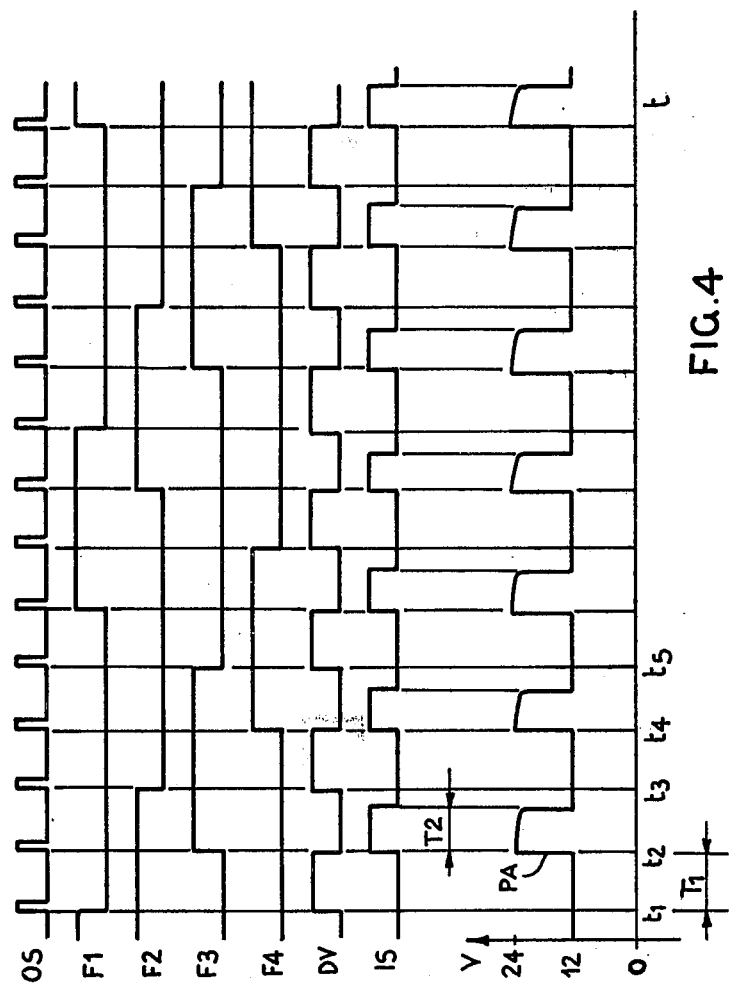
FIG. 4 is a first timing diagram showing the pattern of certain signals of the circuit of FIG. 1.

The operation of the control circuit is as follows. It will be assumed that the rotor 59 (FIG. 2) of the stepping motor 13 is to be rotated in a clockwise direction starting from the initial position shown in FIG. 2, i.e. with the north pole of the permanent magnet positioned halfway between the pole piece 51 and the pole piece 52, by virtue of the simultaneous excitation of the windings 55 and 56. Under such conditions, the signals F1 and F2 are both at logic level 1 (FIG. 4).

At time $t_1$, when the first OS pulse is generated, the signal F1 passes to level 0, and thus the winding 55 (FIG. 2) becomes de-energised, as the transistor 65 is blocked. Only the winding 56 remains energised, the rotor 59 rotates through 45° in a clockwise direction, and moves into the position shown by dashed lines in FIG. 2.

At time $t_2$, when the second OS pulse is generated, the signal F3 passes to level 1, and the signal F2 also remains at level 1. At this moment, the effective energising voltage PA for the windings of the motor 13 passes from its normal value of 12 Volts, i.e. equal to the voltage PW generated by the power supply unit 10, to a value of 24 Volts. Before describing the advantageous effects of this increase in the value of the voltage PA, a description will be given of the manner in which the doubler 14 (FIG. 3) of the circuit 20 produces this voltage increase.

Under the initial conditions, with the signal IS at level 0, the transistor 23 is blocked and the transistor 24 conducts, so that the point 33 is connected to earth. As the point 32 is at the 12 Volt voltage PW, the potential difference between the plates of the capacitor 30 reaches the value of the voltage PW. The voltage PA, taken from point 32, also equals the voltage PW.

When at time $t_2$ (FIG. 4) the signal IS passes to level 1, the transistor 24 (FIG. 3) becomes blocked, while the transistor 23 is switched on and the point 33 is brought substantially to the voltage PW. Consequently, the point 32 passes to a voltage equal to twice PW, i.e. 24 Volts, so that PA also passes from 12 to 24 Volts. When after the time period T2 the signal IS returns to level 0, the voltage PA returns to a value of 12 Volts.

Figure 5:
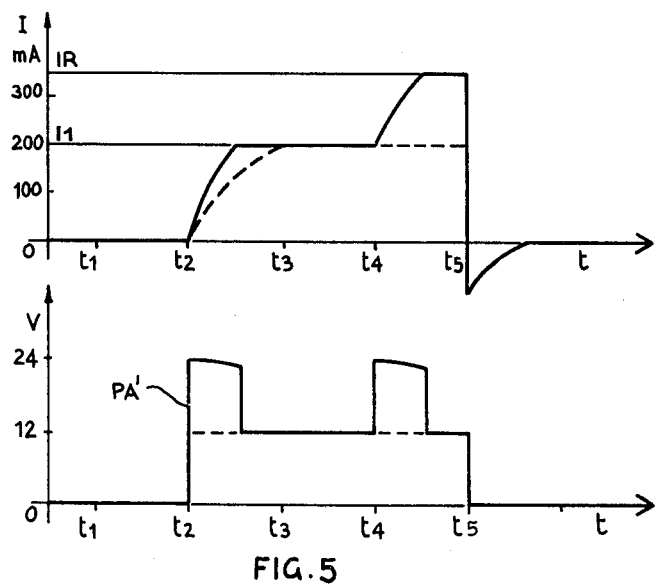
FIG. 5 is a second timing diagram showing details of other signals of the circuit of FIG. 1.

Before time $t_2$ the supply voltage PA' (FIG. 5) for the winding 57 is at 0, as the signal F3 is at level 0, the transistor 67 thus being blocked. At time $t_2$, when the signal F3 passes to level 1 as stated, the transistor 67 is switched on, the supply voltage PA' for the winding 57 passes from 0 to 24 Volts (FIG. 5) and the corresponding current I passes from 0 to the value I1, equal to about 200 mA. The main advantage of initiating the excitation of each motor winding with a voltage double the normal supply voltage is to reduce the rise time of the current in the excited winding. In this respect, as can be seen from FIG. 5, the rising slope of the current I is much steeper than that obtainable with a voltage of only 12 Volts, which is shown by dashed lines on the figure. As the dynamic torque availability has increased, it follows that the rotor 59 (FIG. 2) of the motor 13 moves more rapidly into the new position which it is required to reach, i.e. with the north pole of the permanent magnet halfway between the pole pieces 52 and 53 of the stator 50. The voltage PA remains substantially at 24 Volts for the time period T2 during which the capacitor 30 discharges, and it returns to its rated value of 12 Volts when the signal IS again passes to the value 0. The purpose of the one-shot timer 22 is to limit the duration of the positive IS pulse in order to prevent the potential across the capacitor 30 falling excessively.

At time $t_3$, when the third OS pulse is generated, the signal F2 passes to level 0 and the signal F3 remains at level 1. The voltage PA' (FIG. 5) for feeding the winding 57 is 12 Volts, as IS is at level 0. During this stage, the capacitor 30 (FIG. 3), which had discharged at time $t_2$, recharges as the transistor 24 conducts and the transistor 23 is blocked.

At time $t_4$ (FIG. 4), when the fourth OS pulse is generated, the signal F4 passes to level 1 and the signal F3 also remains at level 1. Again at this time instant, as in any other instant when a synchronisation signal F1, F2, F3 or F4 passes from level 0 to level 1, the effective energisation voltage PA for the windings passes from its rated value of 12 Volts to the double value of 24 Volts, in the manner described heretofore. While the voltage across the winding 58 (FIG. 2) associated with the signal F4 passes from 0 to 24 Volts, the voltage across the winding 57, which is already at 12 Volts, passes to 24 Volts (FIG. 5) and contributes further towards raising the relative current I towards the working value IR.

At time $t_5$ (FIG. 4), when the fifth OS pulse is generated, the signal F3 which energises the winding 57 passes to level 0, so that the voltage PA' and the current I through this latter winding go to 0 (FIG. 5), while the signal F4 (FIG. 4) remains at level 1. The rotor 59, which by virtue of the energisation of the winding 58 alone (time $t_2$) moved into a position in which its north pole faced the pole piece 54, can continue further to rotate relative to the stator 50 if the windings 55, 56 and 57 of the motor are again energised in sequence, in a manner analogous to that described heretofore.

Figure 6:
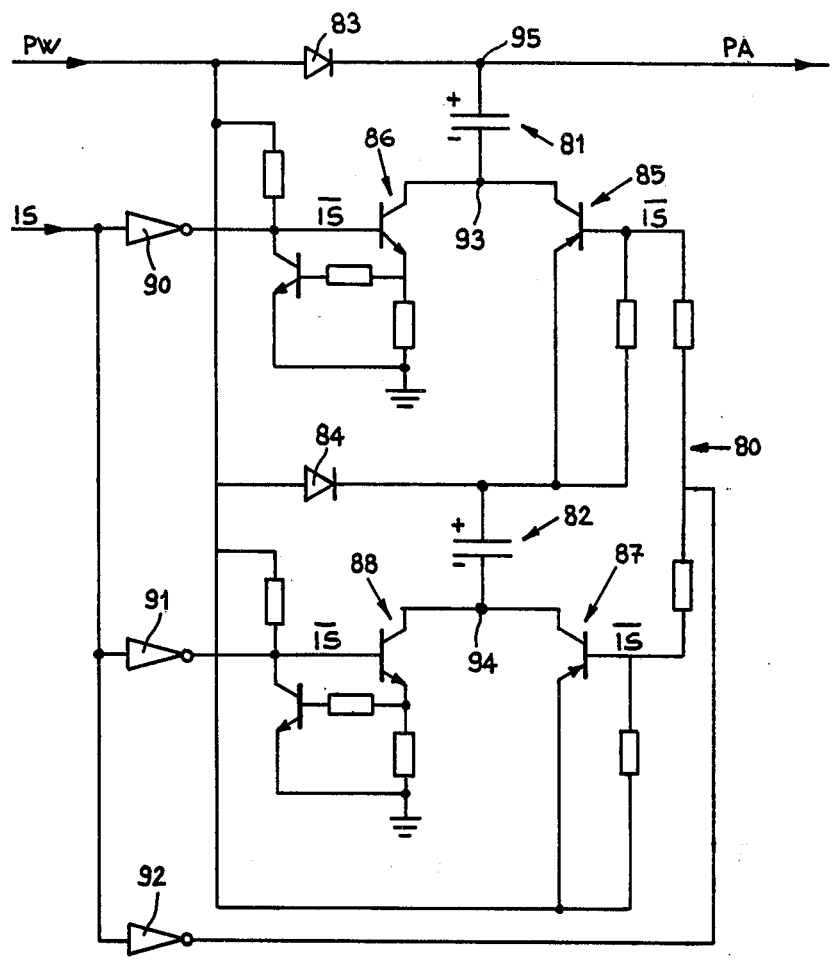
FIG. 6 shows a second embodiment of part of the circuit according to FIG. 1.

FIG. 6 shows a tripler circuit 80 which by using the voltage PW of predetermined value generated by the power supply unit 10, and the signal IS synchronised with the timing pulses OS, can supply a voltage PA which varies from a value equal to that of the voltage PW to a multiplied value equal to three times the value of the voltage PW. Specifically, the circuit 80 comprises two capacitors 81 and 82 having first plates connected to the voltage PW by way of diodes 83 and 84 respectively. The other plates of the capacitors 81 and 82 are connected, at respective points 93 and 94 of the circuit, to the collectors of pairs of transistors 85, 86 and 87, 88 respectively, of which the bases are controlled by the signal $\overline{IS}$, this being the signal IS inverted by three inverters 90, 91, 92.

The circuit 80, which for briefness will not be further described in detail, operates substantially as the already described section 14 of the circuit 20. When the signal IS is at level 0, the transistors 85 and 87 are blocked, and the transistors 86 and 88 conduct, so that the points 93 and 94 are connected to earth, and the capacitors 81 and 82 charge up to the voltage PW. Under such conditions, the voltage PA is equal to the 12 Volt voltage PW. When the signal IS passes to level 1, the transistors 86 and 88 become blocked, whereas the transistors 85 and 87 are switched on. The point 94 passes to the voltage PW, while the point 93 passes to a voltage equal to twice PW, i.e. 24 Volts. The voltage PA, taken at a point 95 on the circuit between the diode 83 and capacitor 81, passes in its turn to a voltage equal ot three times PW, i.e. 36 Volts.

The tripler circuit 80 can be connected into the circuit 20 as a replacement for the doubler 14, if it is required to supply the motor 13 with a voltage PA which passes from a rated voltage to a tripled voltage at the commencement of excitation by any of the motor windings.

It is therefore clear from the present description that the circuit 20 for controlling the stepping motor 13 comprises a voltage multiplier 14, 80 connected between the power supply unit 10 and the motor 13, and synchronised with the timing pulses OS, in order to multiply the predetermined value of the supply voltage at the commencement of excitation of each of the windings 55, 56, 57 and 58 of the motor 13.

It is apparent that the multiplier circuit 14, 80, which has been described herein as connected into a circuit for controlling a stepping motor, can be used also for other applications such as energising electromagnet coils, and more generally for all those applications in which it is required to reduce the current rise time in a winding.

What I claim is:

1. In a control circuit for a stepping motor having a plurality of excitable windings, said circuit comprising a power supply unit for generating a direct current voltage, switching means interposed between said power supply unit and said plurality of excitable windings and selectively actuatable for coupling said power supply unit to said plurality of excitable windings, a timing pulse generator for generating timing pulses, a translator connected to said timing pulse generator for generating a series of sequential logical signals for actuating said switching means and causing the excitation of said plurality of windings, the improvement wherein a voltage multiplier is connected to said power supply unit, to said timing pulse generator and to said plurality of windings for selectively multiplying said direct current voltage at each beginning of excitation of each one of said windings.

2. A control circuit according to claim 1, wherein said power supply unit comprises a first terminal and a second terminal between which said direct current voltage is available, and wherein said voltage multiplier comprises a capacitor having a first armature connected to said first terminal and a second armature connected alternately to said first terminal and to said second terminal, in such a manner that the potential of said first armature alternates between a predetermined value of said direct current voltage, and a value higher than said predetermined value.

3. A control circuit as claimed in claim 2, wherein a first switch is connected between said second armature and said second terminal, wherein a second switch is connected between said second armature and said first terminal, and wherein said two switches are alternately one closed and the other open, controlled by said timing pulses.

4. A control circuit as claimed in claim 3, wherein said two switches comprise two complementary transistors having their emitters connected to said terminals of said power supply unit, wherein both collectors of said two transistors are connected to said second armature of said capacitor, wherein a timer is connected to said timing pulse generator for generating a control signal, and wherein both bases of said two transistors are controlled by said control signal.

5. A control circuit as claimed in claim 1, wherein a timer is connected between said timing pulse generator and said voltage multiplier for generating a control signal which activates said voltage multiplier for a predetermined time.

6. A control circuit as claimed in claim 5, wherein the predetermined time of said control signal is independent of the frequency of said timing pulses.

7. In a control circuit for a stepping motor having a plurality of excitable windings, said circuit comprising a power supply unit having a first terminal and a second terminal, said power supply unit generating a direct current voltage of predetermined value between said first terminal and said second terminal; switching means interposed between said power supply unit and said plurality of excitable windings, and selectively actuatable for coupling said power supply unit to said plurality of excitable windings; a timing pulse generator for generating timing pulses; a translator connected to said timing pulse generator for generating a series of sequential logical signals for actuating said switching means and causing the excitation of said plurality of windings; the improvement wherein a voltage multiplier is connected to said power supply unit, to said timing pulse generator and to said plurality of windings for selectively multiplying the value of said direct current voltage at each beginning of excitation of each one of said windings, said voltage multiplier comprising a capacitor having a first armature connected to said first terminal and a second armature connected alternately to said first terminal and to said second terminal of said power supply unit, in such a manner that the potential of said first armature alternates between a value equal to the predetermined value of said direct current voltage, and a value double said predetermined value.

8. A circuit for multiplying a direct current voltage of predetermined value available between a first and a second terminal of a power supply unit, said circuit comprising a first capacitor having a first armature connected to said first terminal by way of a diode, and a second armature connected to said second terminal by way of a first switch and to said first terminal by way of a second switch, said two switches being selectively controlled in such a manner that one is closed and open alternately while the other is correspondingly open and closed alternately.

9. A circuit according to claim 7, wherein a second capacitor has a firat armature connected to said first terminal by way of a second diode, and a second armature connected to said second terminal by way of a third switch and to the first armature of said first capacitor by way of a fourth switch, said third and fourth switches being open and closed simultaneously with said first and second switches respectively.

* * * * *